United States Patent
Hasegawa et al.

(10) Patent No.: US 8,162,719 B2
(45) Date of Patent: Apr. 24, 2012

(54) METHOD AND DEVICE FOR PROCESSING LENS

(75) Inventors: Keigo Hasegawa, Tokyo (JP); Yoshihiro Kikuchi, Tokyo (JP); Shigeru Takizawa, Kanagawa (JP)

(73) Assignee: Hoya Corporation, Tokyo (JP)

(*) Notice: Subject to any disclaimer, the term of this patent is extended or adjusted under 35 U.S.C. 154(b) by 311 days.

(21) Appl. No.: 12/443,974

(22) PCT Filed: Mar. 27, 2008

(86) PCT No.: PCT/JP2008/055945
§ 371 (c)(1),
(2), (4) Date: Apr. 1, 2009

(87) PCT Pub. No.: WO2008/120691
PCT Pub. Date: Oct. 9, 2008

(65) Prior Publication Data
US 2010/0112907 A1  May 6, 2010

(30) Foreign Application Priority Data

Mar. 29, 2007 (JP) ................................. 2007-089490
Jul. 25, 2007 (JP) ................................. 2007-193907

(51) Int. Cl.
*B24B 49/00* (2006.01)
(52) U.S. Cl. .............. 451/5; 451/42; 451/323; 451/325; 82/11.3
(58) Field of Classification Search .................... 451/41, 451/63, 42, 323, 325, 390, 5; 82/11.3
See application file for complete search history.

(56) References Cited

U.S. PATENT DOCUMENTS

| 5,474,489 A * | 12/1995 | Vernon ........................... 451/42 |
| 6,110,016 A * | 8/2000 | Coleman et al. ................ 451/42 |
| 6,688,944 B2 * | 2/2004 | Hatano et al. ..................... 451/5 |
| 6,872,120 B2 * | 3/2005 | Miyazawa et al. ................ 451/5 |
| 7,070,474 B2 * | 7/2006 | Miyazawa ........................ 451/5 |
| 7,121,931 B2 * | 10/2006 | Katzman et al. ................ 451/57 |
| 7,413,502 B2 * | 8/2008 | Mandler et al. ................ 451/42 |
| 7,494,305 B2 * | 2/2009 | Riall et al. ..................... 409/132 |
| 7,765,903 B2 * | 8/2010 | Schorcht et al. ............... 82/1.11 |
| 2001/0051490 A1 * | 12/2001 | Siders et al. ..................... 451/5 |
| 2006/0189255 A1 * | 8/2006 | Akiyama ......................... 451/5 |

FOREIGN PATENT DOCUMENTS

| JP | 11-146607 | 5/1999 |
| JP | 11-295668 A | 10/1999 |
| JP | 11-300501 A | 11/1999 |
| JP | 2002-036083 A | 2/2002 |
| JP | 2002-120109 A | 4/2002 |
| JP | 2005-001100 A | 1/2005 |
| WO | WO 2006/015761 A | 2/2006 |

* cited by examiner

*Primary Examiner* — George Nguyen
(74) *Attorney, Agent, or Firm* — Blakely, Sokoloff, Taylor & Zafman

(57) ABSTRACT

The optical surface of a lens (21) held and rotated by the rotating shaft (12) of a lathe is cut or ground into an aspherical surface from a direction perpendicular to the axis of the rotating shaft (12) and the axial direction of the rotating shaft (12) while a processing locus (t) which is concentric or spiral about the rotating shaft (12) as the center is formed. In processing, the lens (21) is arranged in a grinding region (20) at a position spaced apart from the turning center (Zo) of the processing locus (t).

14 Claims, 11 Drawing Sheets

METHOD AND DEVICE FOR PROCESSING LENS

This is a non-provisional application claiming the benefit of International application number PCT/JP2008/055945 filed Mar. 27, 2008.

TECHNICAL FIELD

The present invention relates to a method and device for processing a lens for lathing the optical surface of a lens into an aspherical surface while forming a processing locus concentrically or spirally.

BACKGROUND ART

As a lens processing method by means of lathing, for example, a processing method disclosed in Japanese Patent Laid-Open No. 11-300501 is known. According to this processing method, a cutting tool employs different cutting edges in accordance with the processing order or the processing portion of the work, so that various types of cutting operations are realized by one cutting tool.

In lens processing by means of the lathe, as shown in FIGS. 20 and 21, a three-dimensional shape is formed on a lens 21 held and rotated by a rotating shaft (spindle) 12 of a lathe 1 by cutting or grinding with a processing tool from a direction perpendicular to the axis of the rotating shaft 12 while a processing locus t concentric or spiral about the rotating shaft 12 as the center is formed.

The lens 21 forms a disc having a thickness in the Z-axis direction which is the axial direction of the rotating shaft of the lathe 1 and spreading to form a surface in two, X- and Y-axis directions perpendicular to the Z-axis. The lens 21 is held such that its X-Y surface coincides with the end face of the rotating shaft 12. At this time, the lens 21 is positioned such that its center (Zo) is concentric with the rotating shaft 12.

The lens 21 is lathed using the processing tool which is sequentially fed in the X- and/or Y-axis and controlled in the Z-axis. The processing tool is formed using one or a plurality of cutting tools each having a constant radius of curvature, and cuts the lens from the direction perpendicular to the axis of the rotating shaft 12 and the axial direction of the rotating shaft 12.

During lathing, the processing position by the processing tool is sequentially fed from the periphery toward the center of the lens 21. The processing position in the Z-axis direction is numerically controlled in accordance with the moving position, so that a predetermined optical surface is formed by cutting or grinding.

The lens 21 is lathed from its outer periphery toward its center. Namely, the processing locus t starts at the periphery of the lens 21 and ends at the center (Zo). This process (path) is repeated a necessary number of times, thus forming a predetermined lens surface.

Lens processing using the lathe can form many different types of shapes by numerically controlling the processing position. Hence, this processing is suitable for processing an aspheric lens such as a progressive-power lens.

DISCLOSURE OF INVENTION

Problem to be Solved by the Invention

However, the conventional lens processing method using the lathe has the following problem. Namely, a lens is lathed by moving the lens and a processing tool relative to each other while a predetermined portion of the processing tool keeps abutting against the lens at a constant angle.

In processing by the lathe, the abutting position of the grinding tool with respect to the lens, that is, the processing position turns about the rotating shaft of the lathe as the center while the turning radius is gradually decreased. As a result, the entire end face of the lens 21 can be cut or ground into a predetermined three-dimensional lens surface shape.

This three-dimensional lens surface shape can be formed with predetermined accuracy when the processing position spirally moves (traces) on the lens 21. When, however, the processing position of the processing tool reaches the center position Zo of the rotating shaft 12, a specific condition occurs that the relative moving speed of the processing tool to the lens decreases extremely or becomes zero. The abutting position and angle of the processing tool with respect to the lens also changes specifically at the center position. Therefore, as shown in FIG. 22, a defect occurs that the processing accuracy specifically decreases at the center of the lens. In other words, a defect occurs at the center of the lens.

Although the defect at the center of the lens can be decreased by, e.g., controlling the tilt angle of the processing tool, this control is cumbersome and not easy. Even by performing this control, the defect cannot be eliminated completely. Hence, as shown in FIG. 22, a specific decrease in processing accuracy at only the center of the lens is inevitable.

In an optical lens such as a spectacle lens, the transmission image at the center of the field of view is particularly significant. Accordingly, a processing defect at the lens center poses a critical issue. Although this processing defect can be eliminated or corrected by polishing in a later step, it is only when the defect is not grave.

Even if the defect can be eliminated or corrected by polishing in the later step, it increases the load in the later step and hinders the production efficiency. Also, polishing performed for eliminating the defect can cause another error in shape.

Because of the above problem, in lens processing using the conventional lathe, highly accurate lens processing free from defects is difficult. Also, to suppress and correct the defect may decrease the manufacturing efficiency.

The present invention has been made to solve the conventional problem described above, and has as its object to provide, in a lens processing method by means of lathing, a method and device for processing a lens that can perform highly accurate lens processing free from a specific defect efficiently, so that an aspheric lens such as a progressive-power lens can be manufactured easily and highly efficiently.

Other objects and arrangements of the present invention besides those described above will become apparent from the description of this specification and its accompanying drawings.

Means of Solution to the Problem

In order to achieve the above object, according to the present invention, there is provided a lens processing method of processing an optical surface of a lens held and rotated by a rotating shaft of a lathe into an aspherical shape by a processing tool from a direction perpendicular to an axis of the rotating shaft and an axial direction of the rotating shaft while a processing locus which is either concentric or spiral about the rotating shaft as the center is formed, comprising the step of arranging the lens such that at least either one of a geometrical center and optical center of the lens is located at a position spaced apart from a turning center of the processing locus.

According to the present invention, there is also provided a lens processing device including a rotating shaft which holds a lens, a driving device which drives the rotating shaft, and a processing tool which processes an optical surface of the lens into an aspherical shape from a direction perpendicular to an axis of the rotating shaft and an axial direction of the rotating shaft while forming a processing locus which is either concentrically or spirally about the rotating shaft as a center, comprising means for holding the lens in a processing region such that at least either one of a geometrical center position and optical center position of the lens is spaced apart from a turning center of the processing locus, and means for feeding the processing tool in a direction perpendicular to the processing locus and numerically controlling the processing locus in an axial direction of the rotating shaft and in a rotating direction of the rotating shaft on the basis of at least two position parameters including a feeding position of the processing tool and a turning angle of the processing locus.

EFFECT OF THE INVENTION

According to the lens processing method and lens processing device of the present invention, the geometrical center or optical center of the lens is spaced apart from the turning center of the processing locus. Hence, a defect that the processing accuracy specifically decreases does not occur at the center of the lens, and highly accurate lens processing can be performed efficiently. As a result, an aspheric lens such as a progressive-power lens can be manufactured easily and highly efficiently.

The effects of the present invention other than these operation and effect will become apparent from the description of the examples of this specification and its accompanying drawings.

BEST MODE FOR CARRYING OUT THE INVENTION

Figure 1:
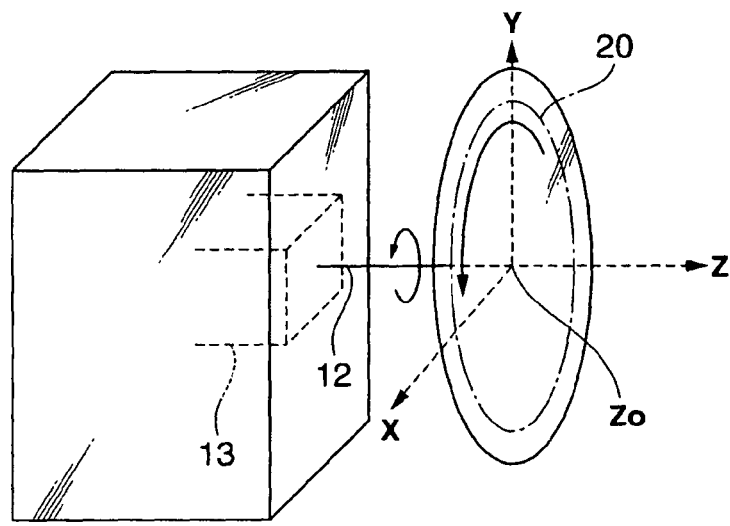
FIG. 1 is a view showing the arrangement of a lathe used in the present invention.
Figure 2:
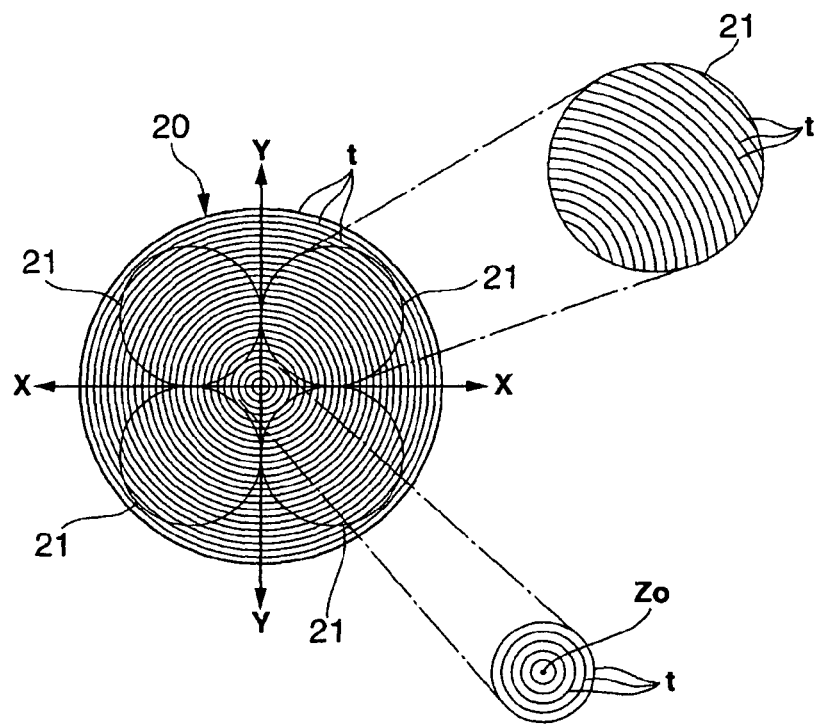
FIG. 2 is a plan view schematically showing the idea of a lens processing method according to the present invention.

Referring to FIGS. 1 and 2, a lathe (to be also referred to as a "lens processing device" hereinafter) 2 includes a rotating shaft (spindle) 12 which holds a plurality of lenses 21, a driving unit 13 which rotatably drives the rotating shaft 12, and a processing tool 30 (FIG. 9) which processes the optical surface of each lens 21 into a three-dimensional lens surface formed of an aspherical surface from directions (X- and Y-axis directions) perpendicular to the axis of the rotating shaft 12 and the axial direction (Z direction) of the rotating shaft 12 while forming a processing locus t which is laid concentrically or spirally about the rotating shaft 12 as the center. In the present invention, processing of the lens 21 includes both cutting and grinding depending on the type of the processing tool 30 to be used. This embodiment shows a case in which the plurality of lenses 21 are attached to the rotating shaft 12 and processed simultaneously. However, the present invention also includes a case in which one lens 21 is attached and processed.

The lenses 21 are processed by feeding the processing tool 30 in the X- and/or Y-axis direction perpendicular to the Z-axis as the axial direction of the rotating shaft 12 and controlling the processing tool 30 in the Z-axis direction. The processing tool 30 is formed of one or a plurality of cutting tools each having a constant radius of curvature, and processes the lenses 21 from the direction perpendicular to the axis of the rotating shaft 12 and the axial direction of the rotating shaft 12.

As shown in FIG. 2, a plurality, e.g., four, of lenses 21 each having lens shape information of a spectacle frame are arranged in advance in a processing region 20 where the processing tool 30 of the lathe 2 operates, and held by the rotating shaft 12. The respective lenses 21 are arranged at positions spaced apart from the turning center (Zo) of the processing locus t to surround the rotating shaft 12, and turn around the Z-axis in this state. The processing tool 30 is fed in a direction parallel to the turning plane and controlled in a direction perpendicular to the turning plane, so the processing tool 30 processes the plurality of lenses 21 in the processing region 20 simultaneously.

In this processing, the processing position of the processing tool 30 sequentially moves from the periphery toward the center of the processing region 20 containing the plurality of lenses 21. The position of the processing tool 30 in the Z-axis direction is numerically controlled in accordance with its moving position, so that the processing tool 30 cuts or grinds the optical surfaces of the lenses 21 into predetermined aspherical three-dimensional lens surfaces, respectively.

Figure 3:
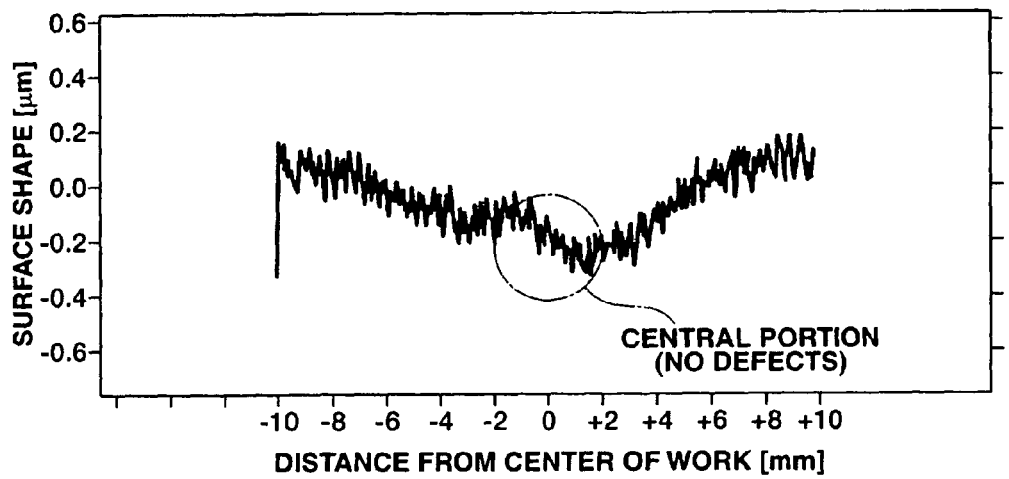
FIG. 3 is a graph showing the state of the shape of a lens surface processed by the present invention.

According to this lens processing method, the optical surfaces of the plurality of lenses 21 can be cut or ground into the predetermined three-dimensional lens surfaces highly accurately at positions off the turning center Zo where a processing defect tends to occur. By this processing, as shown in FIG. 3, the shape of the center of the lens 21 is also formed highly accurately. A property change between the central and the peripheral portions of the lens 21 is small, so that a predetermined or higher lens accurately can be ensured stably throughout the entire field of view.

Therefore, correction in the post process becomes simple or unnecessary, thus greatly improving the processing accuracy and efficiency. As the plurality of lenses 21 are processed simultaneously, as described above, the manufacturing efficiency can be improved greatly.

In this lens processing, aspheric lens such as a progressive-power lens is processed highly accurately without any defect in the entire lens 21. Thus, a lens having high optical accuracy can be fabricated efficiently.

The plurality of lenses 21 arranged around the rotating shaft 12 to surround the turning center (Zo) of the processing locus can be processed simultaneously. Regarding the lenses 21, the processing position in the direction of the rotating shaft (Z direction) is numerically controlled for each lens 21, so that an independent three-dimensional lens surface can be formed on each lens 21. In other words, thickness cutting or grinding amount for each lens 21 is separately controlled numerically, so that the plurality of independent lenses can be manufactured simultaneously.

Figure 4:
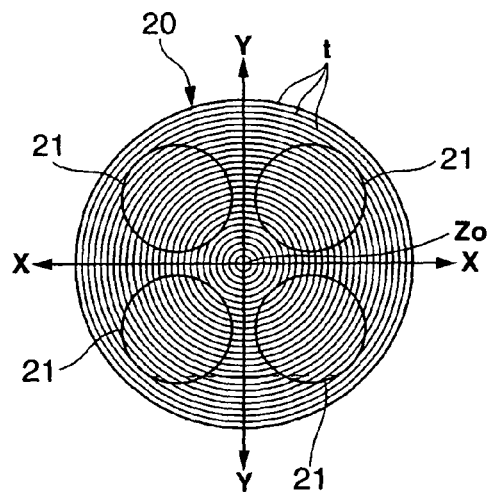
FIG. 4 is a plan view showing a layout example of a plurality of lenses.
Figure 5:
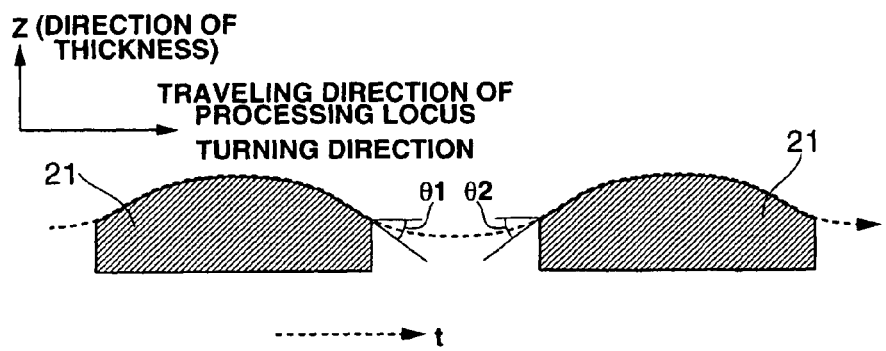
FIG. 5 is a plan view schematically showing a suitable example of a processing locus in the direction of a rotating shaft.

In this case, for example, as shown in FIG. 4, the four lenses 21 are disposed to be spaced apart from each other in the rotating direction. The processing locus in the direction of the rotating shaft between two lenses adjacent in the traveling direction of the turning processing locus which is formed about the rotating shaft 12 as the center is set on the basis of the gradient at the processing locus end portion of the lens 21 located on the leading side of the turning processing locus and the gradient at the processing locus start portion of the lens 21 located on the trailing side of the turning processing locus. More specifically, as shown in FIG. 5, the processing locus, in the axial direction (Z direction) of the rotating shaft and in the rotating direction, between the two lenses 21 adjacent in the traveling direction of the turning processing locus t formed about the rotating shaft as the center is set on the basis of a gradient $\theta 1$ at the processing locus end portion of the lens 21 located on the leading side of the turning processing locust and a gradient $\theta 2$ at the processing locus start portion of the lens 21 located on the trailing side of the turning processing locus t. Thus, each lens 21 can be processed smoothly.

In this case, preferably, the primary differential coefficient of the gradient $\theta 1$ at the processing locus end portion of the lens 21 located on the leading side becomes almost equal to that of the gradient $\theta 2$ at the processing locus start portion of the lens 21 located on the trailing side. Also, preferably, the processing locus t in the axial direction of the rotating shaft at the intermediate portion between the processing locus end portion of the lens 21 located on the leading side and the processing locus start portion of the lens 21 located on the trailing side is a smooth locus including an arc or plane.

The processing locus t at the intermediate portion is numerically controlled by dummy data calculated on the basis of the gradients $\theta 1$ and $\theta 2$, the gap between the two lenses 21, and the like. By setting the dummy data appropriately, the respective processing conditions for the adjacent lenses 21 can become independent reliably. Then, independent three-dimensional lens surfaces can be formed on the adjacent lenses 21 highly accurately.

Figure 6:
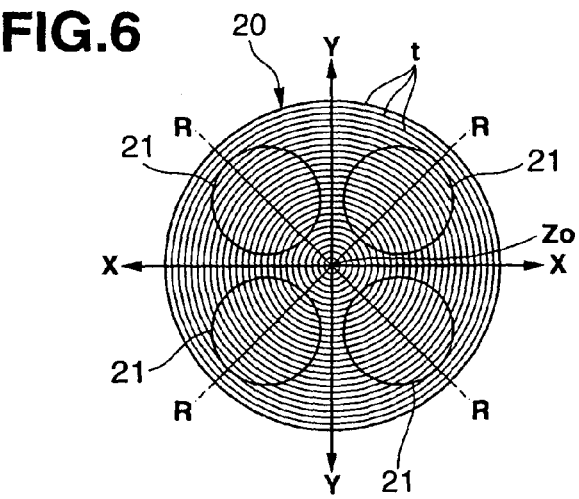
FIG. 6 is a plan view showing a layout example of near/distance power reference positions.

The present invention is suitable to form progressive-power lens surfaces on the plurality of lenses 21. When forming the progressive-power lens, near power measurement reference positions and/or distance power reference positions must be determined. In this case, the reference position may be set along a radiating line (meridians) R (FIG. 6) extending from the turning center through the center of the lens 21. More specifically, the progressive-power lens surface is formed on the lens, and at least one of the near power measurement reference position and distance power reference position for the progressive-power lens is set along the radiating line extending from the turning center through the optical center of the lens. The optical surface for which the present invention is suitably practiced is a centrally asymmetric aspherical shape including a progressive-power lens. A shape obtained by adding to a spherical shape an inclination corresponding to a prism amount is also particularly included in the aspherical shape.

When the change reference for the near/distance power (prism amount) of the lens 21 along the radiating line R is set, the processing locus between the adjacent lenses 21 can be simplified. Also, the moving amount of the processing position of the processing tool 30 toward the direction (Z) of the rotating shaft decreases, so that the processing time can be shortened.

When processing the two surfaces of each lens 21, as the reference position is set on the radiating line R, processing alignment between the two surfaces can be facilitated.

Figure 7:
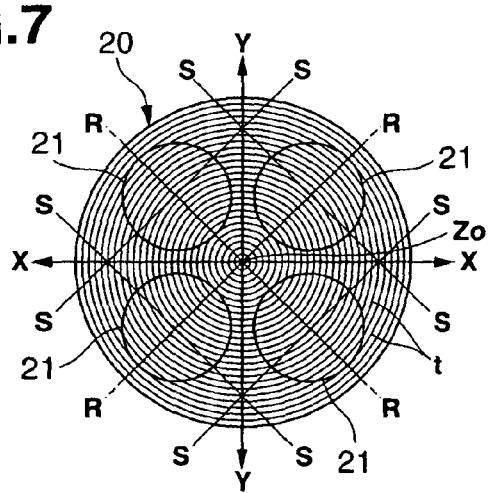
FIG. 7 is a plan view showing a layout example of cylinder axes.

For the same reason, when the astigmatic power of the lens 21 exhibits a negative value, desirably, the direction of the cylinder axis is set along a line S perpendicular to the radiating line R, as shown in FIG. 7.

The lathe 2 used in lens processing described above further includes a means for holding the plurality of lenses 21 each having lens shape information on the spectacle frame in the processing region 20 in advance such that the lenses 21 are spaced apart from the turning center Zo of the processing locus t, and a means for feeding the processing position of the processing tool 30 in the direction perpendicular to the processing locus t and numerically controlling the processing position in the axial direction (Z-axis direction) of the rotating shaft and in the rotating direction of the rotating shaft on the basis of at least two position parameters including the feeding position and the turning angle of the processing locus t.

The practical examples of the lens processing method according to the present invention will now be described hereinafter.

EXAMPLE 1

This example refers to a case in which lens shape information is not given and the lens 21 is set on the lathe 2 through an adapter. This case will be described hereinafter regarding its main portions such as (1) Layout of Lens 21, (2) Processing locus between Lenses and Processing Data Creation, (3) Layout of Lens Design Data, (4) Interpolation Surface Data Creation, (5) Modification of Processing Data Creation, (6) Transmission of Processing Data and Format of Processing Data, (7) Surface Data Smoothing by Spline Function, (8)

Processing Device, (9) Processing Edge and Processing Condition, (10) Processing Procedure, and (11) Surface Formation Processing.

(1) Layout of Lens

The lenses 21 are respectively formed of uncut circular lenses. For example, four circular lenses 21 are arranged equiangularly around the rotating shaft 12 (FIG. 1) of the lathe 2 (see FIG. 4). The rotating shaft 12 of the lathe 2 is moved and positioned outside the lenses 21. Alternatively, the circular lenses 21 may be moved with respect to the rotating shaft 12 and positioned outside the rotating shaft 12.

In this case, the minimal gap between the lenses is preferably 5 mm to 10 mm or more. A minimal gap of approximately 0.1 mm to 50 mm is also suitable. If the quality of the peripheries (for example, the outer peripheries of approximately 5 mm to 10 mm) of the circular lenses 21 is not taken into consideration, the lenses can be arranged in partly contact with each other. Note that a case in which the gap between the lenses is 5 mm or less and the shapes, e.g., the gradients or position coordinates, of the peripheries of the adjacent lenses are extremely different is excluded.

(2) Processing Locus Between Lenses and Processing Data Creation

Regarding a method of synthesizing the processing locus between the lenses with processing data KD (FIG. 13), a processing locus in which the oscillation in the vertical direction is suppressed as much as possible is suitable. For example, free-form surface data is created from plane processing data in accordance with a known technique such as circular interpolation, NURBS interpolation, or spline interpolation.

In this case, preferably, the processing locus between the lenses is formed to be axi-symmmetric with the plane by circular interpolation. The two ends of the processing locus between the lenses, i.e., the connecting portions of the processing locus between the lenses with the lens processing data formed smoother processing loci with smaller oscillation in the Z direction.

As a result, the moving amount of the processing device in the vertical direction (Y direction) can be decreased, so the processing time can be shortened easily.

(3) Layout of Lens Design Data

To create the processing data KD, virtual processing data for arranging the optical design value of one lens or each of a plurality of lenses is prepared in advance. The virtual processing data consists of lens optical surface shape data for arranging one or the plurality of lenses and a blank portion where no lens is present and accordingly no shape data is present. In addition, the virtual data preferably includes a processing locus where a processing edge travels for performing processing. In this case, calculation using only point sequence data on the processing locus suffices. As the shape data of the entire surface need not be calculated, the calculation process can be decreased.

Then, the lens optical surface data is arranged on the virtual data. Each lens optical surface data is arranged on the virtual processing data such that it corresponds to the layout of the lenses to be processed later. Hence, the optical surface shape data of the lenses 21 is arranged at a position where the layout of the lenses on the virtual processing data corresponds to uncut lenses on the processing device.

In brief, to create the processing data, first, the lens shape data (three-dimensional shape data) of each lens 21 is created. The lens shape data is arranged on the virtual data. The shape data is arranged by arranging (replacing) the processing data of the lens design vales of the respective lenses on those regions (virtual processing data) of the processing region 20 where the respective lenses 21 are to be arranged. Then, the respective lenses 21 are arranged on those regions of the processing region 20 where the respective processing data are given.

(4) Interpolation Surface Data Creation

The format of the lens design value is surface data expressed by, e.g., height data matrix or a spline function. After the lens design data is arranged on the virtual processing data, interpolation surface data to connect the lenses with the processing locus t is created. As the interpolation surface data, a surface which is bonded to the lens design surface continuously and smoothly at the boundary is preferable. A practical creating method will be described hereinafter.

The spiral processing locus t or a plurality of concentric circles about the rotating shaft 12 of the lathe 2 as the center are formed on the virtual processing data on which only the lens design values are arranged. The number of concentric circles is approximately 30 to 70 if the region has a diameter of, e.g., approximately 200 mm.

The three-dimensional coordinate values and a gradient Ki (periphery gradient) of the periphery of the lens design data which corresponds to the processing locus t or concentric circles are calculated. A surface having a vertex or inflection point between adjacent gradients Ki and smoothly connected to Ki is specified.

To be "smooth" in the present invention signifies that the three-dimensional position coordinate values of the lens design surface coincide with those of the boundary surface of the interpolation surface data and that the primary differential coefficient and quadratic derivative on the interpolation surface data coincide with those on the lens design data.

Furthermore, the interpolation surface data on the processing locus which connects the lenses preferably includes at least one inflection point where the sign of the quadratic derivative changes (regarding a method of calculating the three-dimensional coordinate values and gradient, refer to surface data smoothing by means of a spline function (to be described later)).

(5) Modification of Processing Data Creation (Extrapolation at Connecting Portion of Interpolation Data)

As a modification, it is also preferable to perform extrapolation by adding appropriate data (e.g., for approximately 10 mm) around the lens design value. "Extrapolation" is a mathematical term which means obtaining a missing experimental or calculation value by presumption from several experimental values (calculation values) that are already determined by an experiment or calculation. In this case, the boundary surface of the interpolation surface data is replaced with the lens design value. The three-dimensional coordinate values and gradient are calculated on the basis of the periphery of the extrapolation data, thus creating interpolation.

Prior to creation of the interpolation surface data, a spiral processing locus may be formed on only the arranged design data region, and positions where no spiral path is present undergo interpolation, thus creating the interpolation surface data.

(6) Transmission of Processing Data and Format of Processing Data

The processing data (lens design data and interpolation surface data) calculated in the above manner are sent to the lathe 2 such that they are capable of information exchange with each other. As the format of the processing data, height data matrix, surface data using a spline function, or processing point sequence data including the processing locus t is suitable.

(7) Surface Data Smoothing by Spline Function

For smoothing the surface data by means of spline function, a method of fitting a spline function to two-dimensional discrete data by using a two-dimensional spline function (see, e.g., Fujiichi Yoshimoto et al, "Spline Function and Its Application" 5th edition, 1985 Feb. 1, Kyoiku Shuppan) was employed. The two-dimensional spline function is a normalized m-order B-spline function defined by the following equation (1):

$$S(x, y) = \sum_{i=1}^{h+m} \sum_{j=1}^{k+m} Cij Nmi(x) Nmj(y) \quad (1)$$

where Nmi(x) and Nmj(y) respectively satisfy Nmi(x)=(ξi−ξi-m)Mmi(x) and Nmj(y)=(ηj−ηj-m)Mmj(y)

In the above equation (1), m is the order, h+2m is the number of nodes in the x direction, ξi is the defined node position in the x direction, k+2m is the number of nodes in the y direction, ηi is the defined node position in the y direction, and cij is a coefficient.

One processing surface of the convex surface and concave surface of the spectacle lens 21 to be processed by a curve generator (surface processing device) undergoes fitting using the spline function having the format described above. Assuming that the form function of the convex surface is expressed as F(Y, Z) and that of the concave surface is expressed as G(Y, Z), the height (X-coordinate position) of the convex or concave surface at a certain point (Y1, Z1) can be expressed by the following F(Y1, Z1):

$$F(Y1,Z1)=\Sigma CijNmi(Y1)Nmj(Z1)$$

Note that Nmi(Y)Nmj(Z) is a function depending on the node, which is a feature of the spline function. Cij is a coefficient obtained when fitting the shape. This coefficient is obtained using the method of least squares.

The three-dimensional position coordinates and gradient of the lens design surface at an arbitrary position are calculated from the three-dimensional shape data of the form function F.

(8) Processing Device

Figure 9:
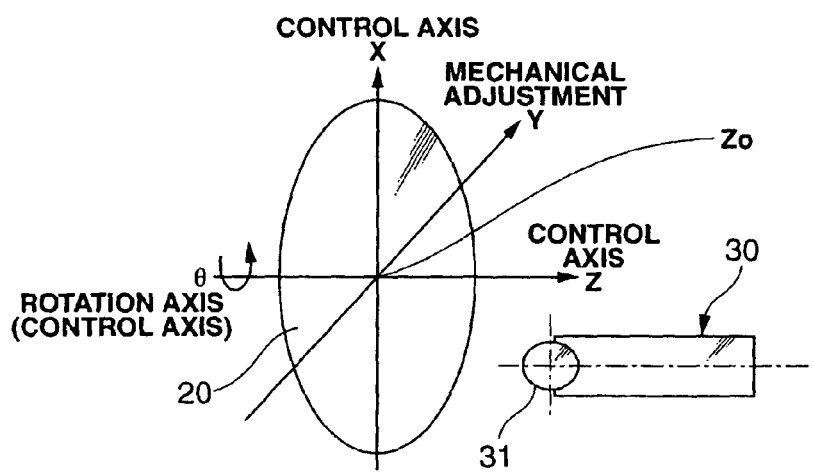
FIG. 9 is a view showing the arrangement of a lens processing device used in an example of the present invention.

According to this example, an NC-controlled curve generator shown in FIG. 9 was used. In FIG. 9, the processing tool 30 has a cutting edge (cutting tool) 31.

When cutting the lens 21, that is, a lens blank, sintered polycrystalline diamond or single-crystal natural diamond is employed as the material of the cutting edge 31 of the processing tool 30.

When cutting the lens 21 as the lens by the processing tool 30, the lens 21 is attached to the processing region 20. The lens 21 does not move but rotates together with the rotating shaft 12. The cutting edge 31 processes the lens 21 from the outer periphery of the lens by two-axis control in the radial direction (X and Y directions) and in the Z direction, that is, control in a total of three axes.

In formation of an optical surface, processing is performed automatically upon transfer of the design shape height data of the lens 21 expressed by the matrix of the Z position corresponding to the X and Y positions to the NC controller of the curve generator. The curve generator has a tight tolerance of 3 μm or less (evaluation with a lens diameter of 50 mm) and a maximum surface roughness Rmax of approximately 0.1 μm to 0.9 μm. The surface roughness was measured by a method according to JIS B 0601 (ISO4287), JIS B 0633 (ISO4288), or JIS B 0651 (ISO3274).

(9) Cutting Edge and Processing Condition

When the cutting edge 31 has a sharp point (e.g., as sharp as the point of a needle or injection needle), the defects of the lens 21 at the rotation center Zo can be suppressed to be comparatively small. When, however, the lens 21 to be processed is, e.g., a spectacle lens having a comparatively large outer diameter (e.g., 80 mm), a small cutting edge cannot be used due to problems such as the processing time and the durability of the cutting edge 31. In this case, a cutting edge having a predetermined size (e.g., with a radius of curvature of 5 mm, a cutting surface angle of 60°, and a thickness of 1 mm to 5 mm) is generally used.

Figure 10A:
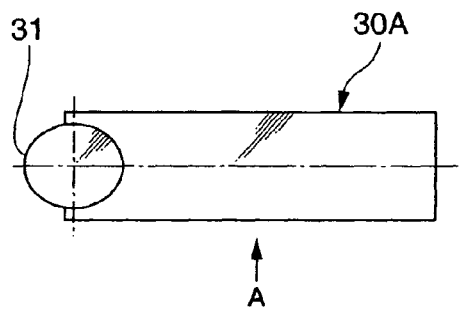
FIG. 10A is a plan view showing an arrangement of a processing tool used in the example of the present invention.
Figure 10B:
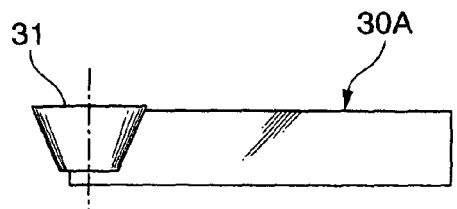
FIG. 10B is a view of the processing tool in FIG. 10A seen from the direction of an arrow A.
Figure 11:
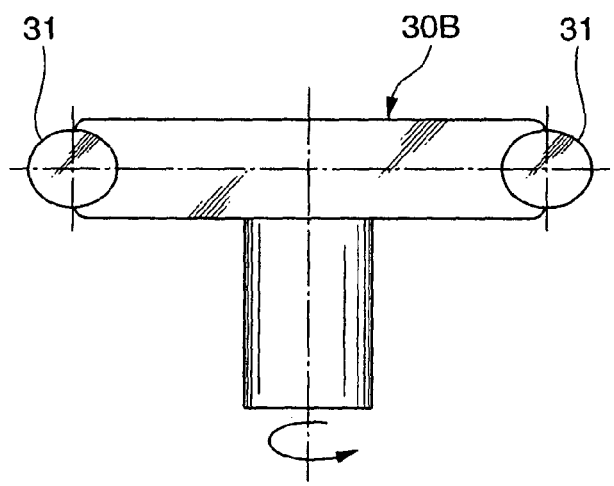
FIG. 11 is a plan view showing another arrangement of the processing tool used in the example of the present invention.
Figure 12:
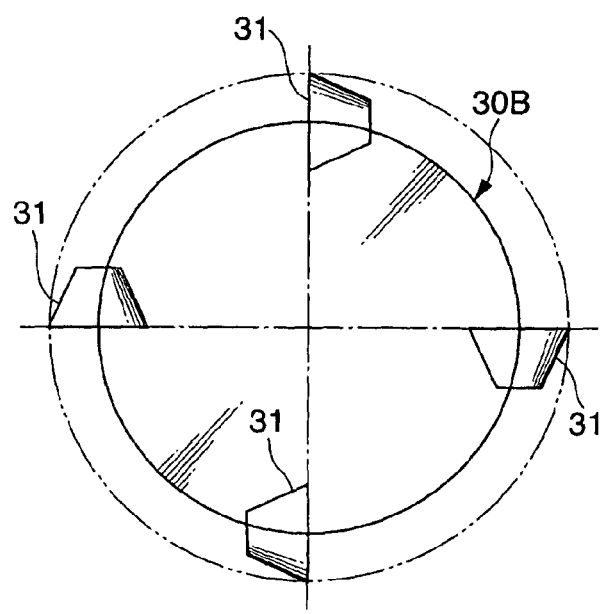
FIG. 12 is a front view of the processing tool shown in FIG. 11.

For example, in this example, as the cutting edge 31 for rough processing, a polycrystalline diamond cutting edge having a cutting portion with a radius of curvature of 5 mm to 12 mm, an effective cutting surface angle of 360°, and a thickness of 5 mm was used alone. As the cutting edge 31 for rough processing, a single cutting tool 30A as shown in FIGS. 10A and 10B, or a milling tool 30B having a plurality of cutting edges 31 arranged on one circumference, as shown in FIGS. 11 and 12, can be used. When the cutting tool 30A is used, it performs cutting. When the milling tool 30B is used, it performs grinding.

As the cutting edge 31 for finishing, a single-crystal diamond cutting edge having a cutting portion with a radius of curvature of 1 mm to 5 mm, an effective cutting surface angle of 20° to 120°, and a thickness of 3 mm was used.

In this example, as lens shape information is not given, an ordinary uncut lens (circular lens) is employed as the lens 21. In this case as well, the rotating shaft 12 is located outside the lens 21. A case in which lens shape information is given will be described following in Example 2.

(10) Processing Procedure

Figure 13:
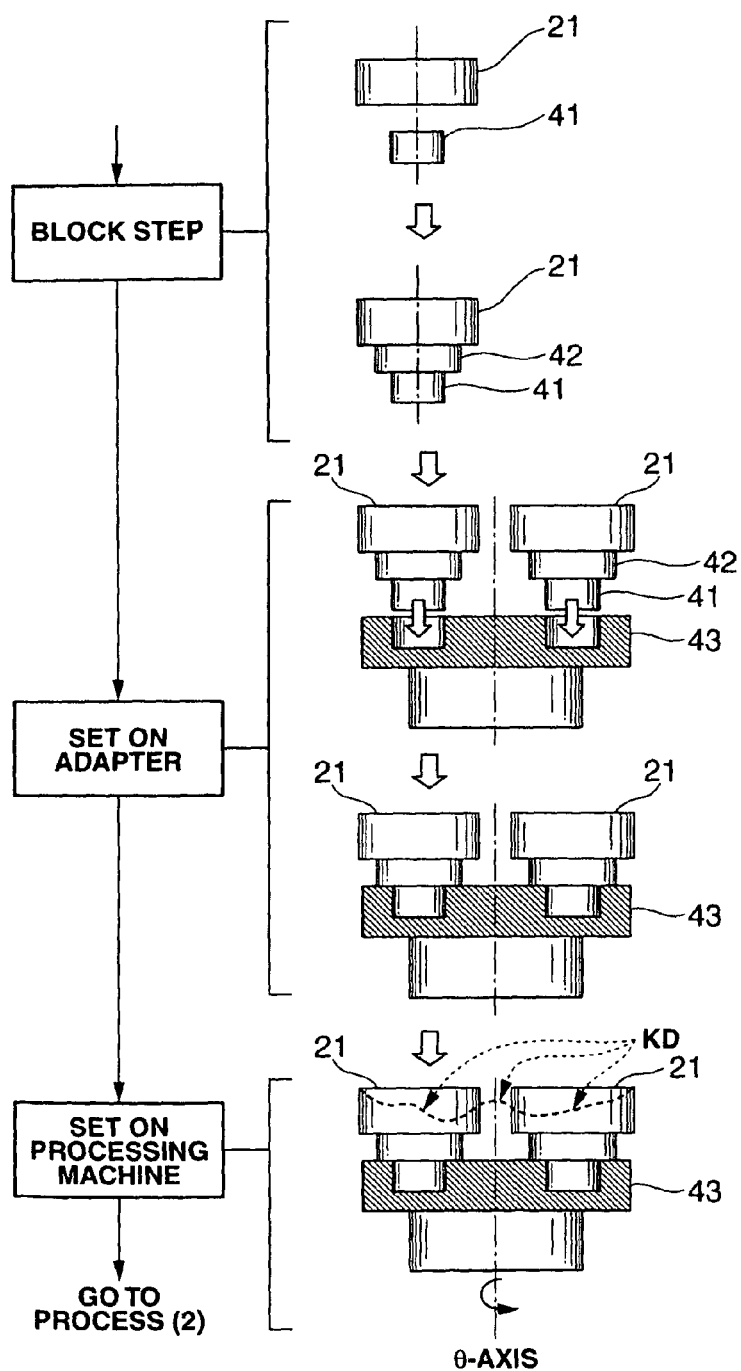
FIG. 13 is a main part flowchart of the pre-stage of a machining process according to the example of the present invention.
Figure 14:
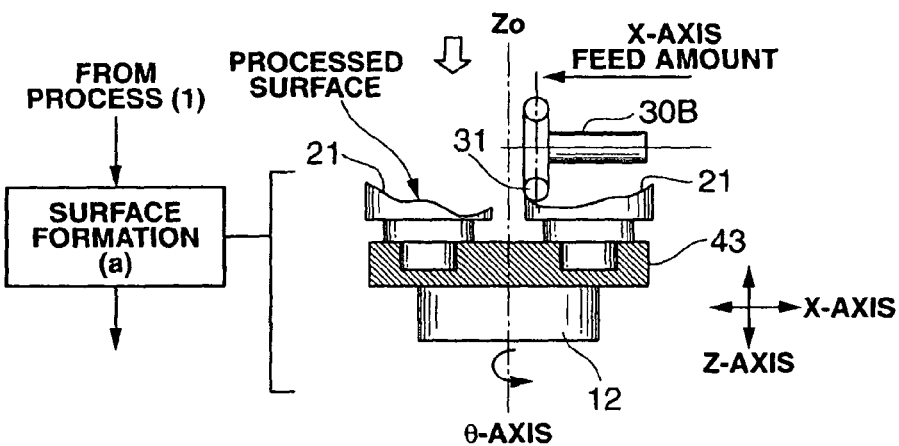
FIG. 14 is a main part flowchart of the post-stage of the machining process shown in FIG. 13.

The lenses 21 are processed in accordance with the step sequence shown in FIGS. 13 and 14. First, as shown in FIG. 13, as the preparation step (block step), blank selection, blank fixing, blocking, setting of the lenses to the adapter, and the like are performed.

In selection of the blanks (lenses 21), necessary blank sizes (diameter, thickness, concave/concave shape) are selected in accordance with the frame lens shape information and prescription values. The blanks are picked up, and protection tapes as fixing materials 42 are adhered to their unprocessed surfaces. Holding members 41 are adhered to the blanks 21 through the fixing materials 42. As the fixing materials 42, other than the protection tapes, for example, an adhesive, pressure-sensitive adhesive, or low-refractory alloy may be used.

More specifically, the lens blanks 21 are blocked by the holding members 41 in advance in accordance with a known technique. The blocked lens blanks 21 are fixed to an adapter (holding jig) 43 through the holding members 41.

The adapter 43 has holes to fit with the plurality of holding members 41. Although two to four lens blanks 21 are arranged in this example, five or more lens blanks 21 can be arranged. The adapter 43 to which the lens blanks 21 are fixed is mounted at the predetermined position of the processing device (curve generator).

In this case, the adapter 43 may be fixed to the processing device in advance, and the blocked lens blanks 21 may be set on the adapter 43. Namely, the lens blanks 21 may be set on the processing device directly.

Figure 15:
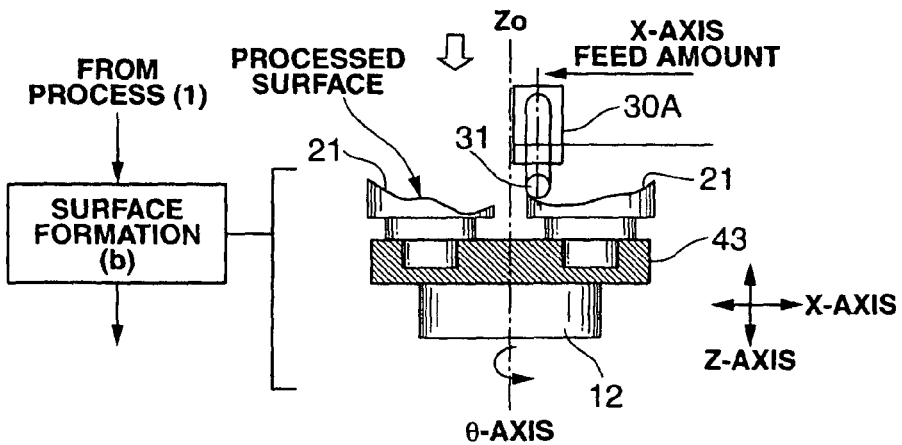
FIG. 15 is a main part view showing another example of the post-stage of the machining process shown in FIG. 13.

When setting the lens blanks 21 on the adapter 43 of the processing device, preferably, a plurality, e.g., two or more, of lens blanks 21 are arranged. The method of arranging the lens blanks 21 is not particularly limited as far as they are arranged at positions other than the processing center (rotation center Zo), as shown in FIG. 14 or 15. Preferably, the lens blanks are arranged symmetrically about the processing center. FIG. 14 shows a case which uses the milling tool 30B, and FIG. 15 shows a case which uses the cutting tool 30A.

When the lens blanks 21 are astigmatic-power lenses, they are preferably arranged such that the directions of cylinder axes are perpendicular to the axial direction of the processing center. When the lens blanks 21 are progressive-power lenses, preferably, their distance or near path power measurement reference points are arranged along the axial direction of the processing center. This is because with this arrangement, in both cases, the processing locus between the lenses is simplified as much as possible, and the moving amount of the processing device is decreased, thus shortening the processing time.

(11) Surface Formation Processing

Surface formation processing is performed spirally based on the processing data from a position the farthest from the rotating shaft 12, as shown in FIG. 14 or 15. The processing edge 31 sequentially traces the lens surface data and interpolation data and reaches the rotation center Zo of the lenses 21, thus completing surface formation processing. In this case, alternatively, processing may be preferably performed spirally from the center to the periphery of the processing region.

When processing is completed, the lenses 21 are removed from the processing device.

A supplementary explanation will be given on a mechanism that causes a processing defect.

Assume that the lens is a progressive-power lens having a thickness reducing prism at the geometrical center, a single-vision lens the prescription values of which include a prism amount, or a lens which includes both a thickness reducing prism and a prism amount. When the lens is processed by a lathe, a defect corresponding to the prism amount inevitably occurs unless the following countermeasure is taken.

Particularly, in a spectacle lens, as the lens outer shape forms a circle, the lens is generally processed such that the rotating shaft of the processing device coincides with the geometrical center of the circle of the lens. Particularly, a progressive-power lens generally has a thickness reducing prism at, e.g., the lens geometrical center. Accordingly, when processing a progressive-power lens, a single-vision lens including a prism, or a lens which includes both a thickness reducing prism and a prism amount, a center defect occurs to correspond to the prism (gradient) amount of the lens geometrical center.

In view of this, conventionally, to avoid a defect occurring at the lens geometrical center, the lens 21 is tilted in advance and held such that its center is horizontal. When, however, the lens 21 is tilted and held, as the tilt amount differs depending on the different processing operations, tilt control by the holding member becomes cumbersome. In addition, the tilt amount must be controlled accurately, which is not easy.

Figure 17:
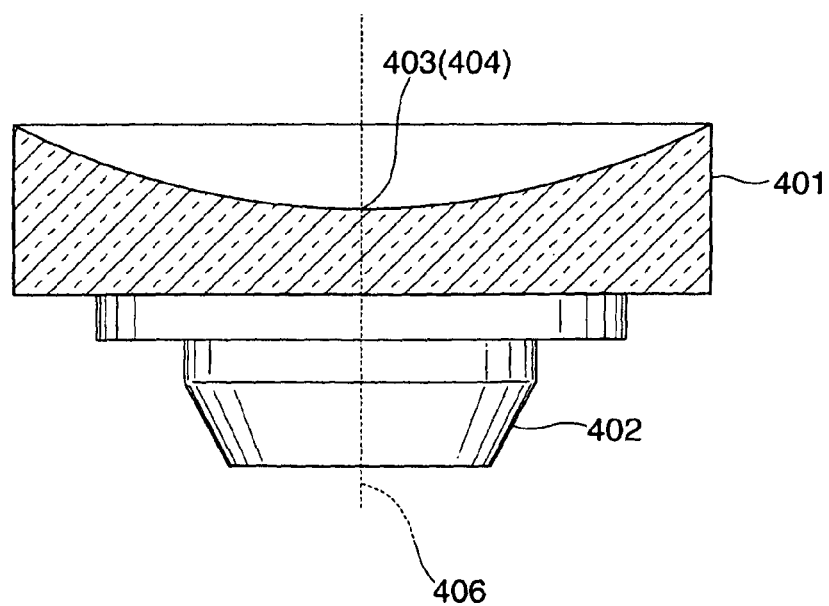
FIG. 17 is a sectional view showing a block having no prism and a cutting shape.

For example, as shown in FIG. 17, assume that a lens 401 not including a prism amount is held by a horizontal block 402 and cut. In this case, as the processing shape does not include a prism, even on the horizontal block, the direction of normal to a lens work surface 403 of the lens 401 which intersects the lens rotation axis coincides with a rotation axis 406, and interference with the processing edge does not occur.

Figure 18:
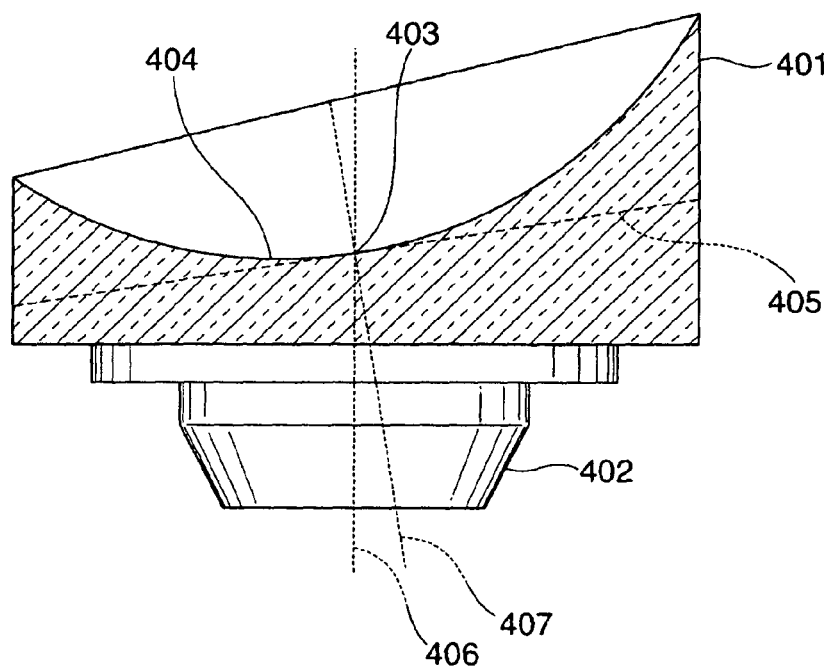
FIG. 18 is a sectional view showing a cutting shape having a prism and a horizontal block.

As shown in FIG. 18, assume that a lens 401 including a prism amount is held by the horizontal block 402 and cut. In this case, as the processing shape includes a prism, on the horizontal block, a direction 407 of normal to a lens work surface 403 which intersects the lens rotation axis does not coincide with a rotation axis 406, and in processing near the rotation axis, interference with the processing edge occurs. The position on the horizontal lens surface is the position indicated by reference numeral 404. Hence, to dispose the rotation axis 406 at this position 404 is also effective in avoiding interference with the processing edge.

Figure 19:
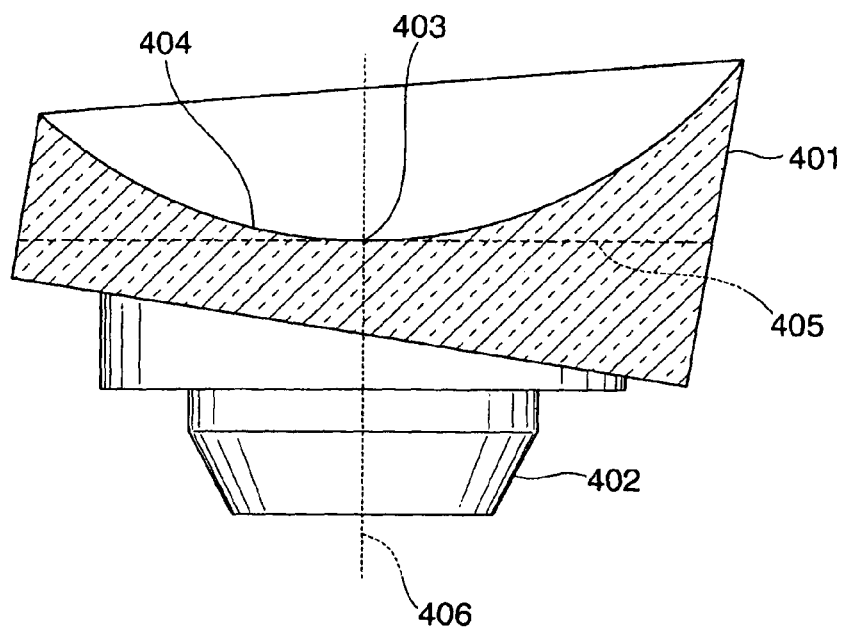
FIG. 19 is a sectional view showing a shape having a prism and a prism block.
Figure 20:
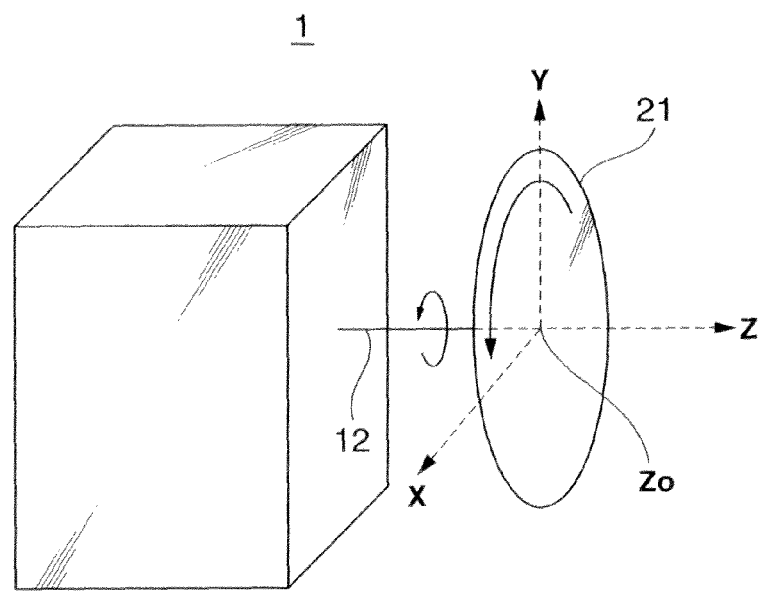
FIG. 20 is a view showing the general idea of a lens processing device using a lathe.
Figure 21:
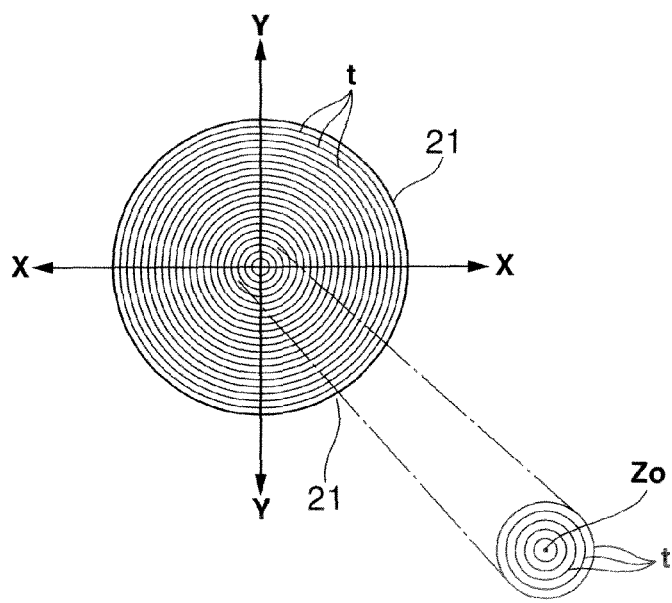
FIG. 21 is a plan view schematically showing the idea of a conventional lens processing method which uses a lathe.
Figure 22:
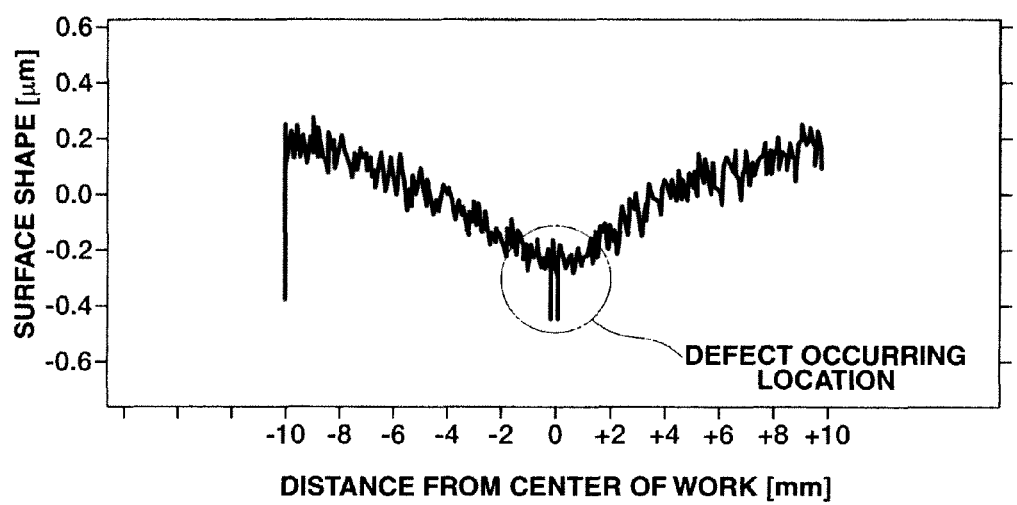
FIG. 22 is a graph showing the state of the surface shape of a lens processed by the conventional lathe.

Furthermore, as shown in FIG. 19, assume that a lens 401 including a prism amount is held by a tilted block 402 and cut. In this case, as the block 402 has a tilt corresponding to the prism of the processing shape, the direction of normal to a lens work surface 403 which intersects a rotation axis 406 coincides with the rotation axis 406, and interference with the processing edge does not occur. Note that calculation of the angle of tilt at the position 403 on the lens 401, tilt angle control of the block 402, and precise coincidence of the rotation axis 406 with the position 403 on the lens are not easy to achieve.

When the lens has a small prism amount, the defect decreases. Hence, in the prior art, if a defect occurs at the lens center, the lens undergoes polishing as a post-process with a controlled removing amount so the defective portion can be removed.

In this case, as a necessary practical countermeasure, the defect must be removed by a polishing amount sufficiently larger than the defect. When the polishing amount increases, however, the shape error caused by polishing also increases. Then, lens shape control becomes difficult, and the processing time prolongs.

A further description will be made on the processing defect. In processing an optical surface by a three-axis lathe, when the processing shape of the lens (called lens as well) intersects the processing center serving as the rotating shaft (is included in the X-Y plane in FIG. 9), no defect occurs.

When, however, the lens processing surface has a gradient with respect to the X-Y plane (is not perpendicular to the Z direction) and, at a position intersecting the rotating shaft, has an inclination with respect to the direction of normal to the rotating shaft, a processing defect unique to lathe processing occurs at the center of the lens processing surface. This processing defect may occur because, as the processing edge has a predetermined thickness, during processing the lens center, the lower side of the processing edge interferes with the lens partly.

The present invention allows to overcome such a problem and enables processing that does not cause a defect at the lens center.

EXAMPLE 2

This example refers to a case in which lens shape information is given and a lens is set on a processing machine through an adapter. This case will be described hereinafter regarding its main portions such as (1) Lens Shape Data, (2) Processing Data Calculation, (3) Layout of Frame Lens Shape, and (4) Layout of Rotating Shaft of Processing Device.

(1) Lens Shape Data

Lens shape data is sent to the manufacturer in response to an order from an optician. The optician inputs specification information on the spectacle lens such as the optometric prescription data of the customer, frame lens shape data, and the frame center distance which are necessary in lens design.

The specification information includes the type of V-block, the position of the V-block, three-dimensional frame shape information, the type of antireflection coating, the type of lens color, and the product code that specifies the type of spectacle lens. The prescription data includes the spherical powers, cylindrical powers, cylinder axes, and addition powers of the customer's left and right eyes, the interpupillary distance, and the naked vision.

The input spectacle lens information, prescription values, and spectacle frame information are transferred online to the spectacle lens design device of the manufacturer (to be also referred to as a factory hereinafter) through the communication line. The frame lens shape information is expressed by, e.g., the polar coordinates using the angle and length, and is generally expressed by point sequence data including 360 points.

(2) Calculation of Processing Data

Using the forwarded data, the spectacle lens design device calculates processing data to be used by the lens processing device, and transfers the result to the respective processing machines through the LAN circuit. Upon completion of the calculation, the factory issues a processing instruction form containing the content of order received and processing instruction.

In calculation processing, related lens processing information including the layout of the frame lens shape on the lens, the layout of the circular lens on the processing device, the layout of the rotating shaft of the processing device, and generation of processing data is calculated. The calculation processing will be briefly described hereinafter.

(3) Layout of Frame Lens Shape

In accordance with the order received, the lens shape position on the circular lens is specified on the virtual processing data. The lens shape position is specified based on the lens optical center and lens outer diameter as the lens-related information, the frame center distance and lens shape information as the frame-related information, and the interpupillary distance as the prescription-related information, and is arranged on the virtual processing data. A method of arrangement is disclosed in, e.g., Japanese Patent Laid-Open No. 2006-47782, and accordingly a description thereof will be omitted.

(4) Layout of Rotating Shaft of Processing Device

In Example 1, a case in which a lens shape SO (FIG. 16) is not given is described. In Example 2, a method of arranging the rotating shaft to be located outside the lens shape information on the uncut lens based on the lens shape information will be described.

First, the lens shape is calculated from the accepted frame shape. The region (to be also referred to as a lens shape outside region hereinafter) located outside the lens shape is specified.

The lens shape maximum outer diameter distance with which the specified region corresponds to the lens geometrical center or frame center is calculated. After calculation of the lens shape maximum outer diameter distance, the rotating shaft is arranged at a position away from the lens shape maximum outer diameter distance with reference to the lens geometrical center or frame center. Alternatively, the rotating shaft is arranged in a circle having a diameter smaller than the radius of a minimum inscribed circle of the lens shape.

More specifically, the arrangement of the rotating shaft is controlled by moving the lens and the cutting edge relative to each other. Furthermore, according to the present invention, the distance portion measurement reference position or near portion measurement position is arranged along the center of the rotating shaft. Hence, the B-size direction of the lens shape becomes parallel to the center of the rotating shaft.

Generally, in the frame, the A size is larger than the B size. When the A-size direction is arranged along the center of the rotating shaft, the rotating shaft can be arranged in the region outside the lens shape easily.

In this example, the center of the rotating shaft is positioned in the outside region of the lens shape individually. Alternatively, the tendency of the accepted data may be analyzed, the lens shape maximum outer diameter distance with which the center of the rotating shaft is located outside the lens shape region in most orders received may be specified, and the layout position of the lens may be stationarily fixed. In this case, for the individual order received, the distance between the central position of the rotating shaft and the position of the lens geometrical center is calculated with reference to the lens shape maximum outer diameter, and whether or not processing is possible is determined.

More specifically, the lens region which is to be ground by edging is specified from the lens shape position on the lens. The rotating shaft is arranged in the outside region (lens shape outside region) of the lens shape. According to this layout method, virtual processing data on which the rotating shaft is arranged is prepared in advance. The lens design value is arranged such that the rotating shaft is disposed at a position closest to the frame center or lens geometrical center in the lens shape outside region.

Figure 16:
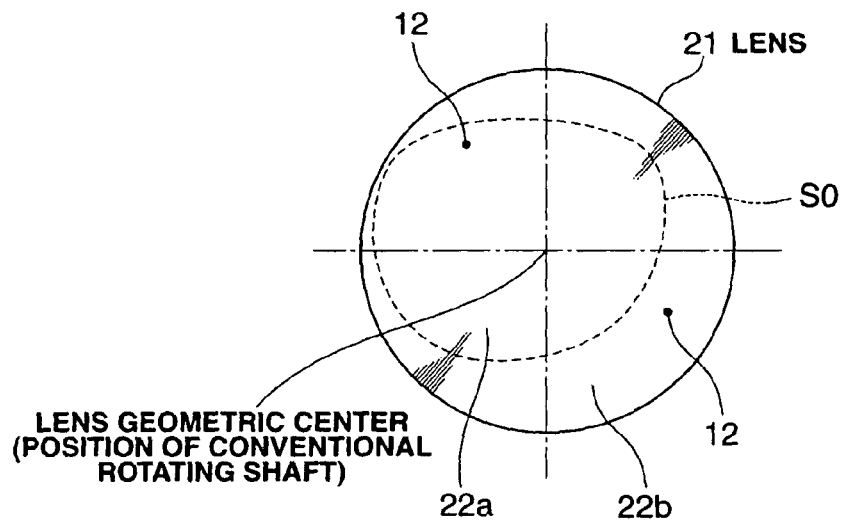
FIG. 16 is a view showing a modification of the layout example of the rotating shaft of the present invention.

In this case, the rotating shaft 12 is preferably arranged at a position spaced apart from the lens. As a modification, preferably, the rotating shaft 12 can be arranged in the lens 21 or at an arbitrary position (layout example 1) in a lens shape outside region 22b, as shown in FIG. 16. According to another modification, if the rotating shaft 12 is set apart from at least the lens geometrical center, as shown in FIG. 16, the position to arrange the rotating shaft 12 is not limited to the lens shape outside region 22b, but the rotating shaft 12 may be arranged in a lens shape inside region 22a or outside the lens region (layout example 2).

Although one lens shape is arranged on one uncut lens, a modification is also preferable in which two or more lens shapes are arranged on one lens. For example, as the spectacles are often formed by pairing, a pair of left and right lenses can be arranged on one lens.

The processing device used in processing described above can be implemented by only slightly changing the lens holding mechanism portion, the control condition for the lens holding mechanism portion, and the like in the function that the conventional lens processing device using the lathe originally has. Therefore, highly accurate lens processing and highly efficient lens manufacture that cannot be achieved by the conventional processing device can be performed while making use of the resources of the conventional processing device.

Figure 8:
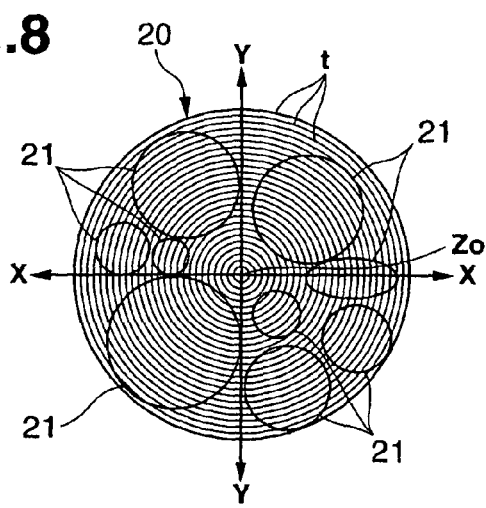
FIG. 8 is a plan view showing a layout example of a plurality of lenses having different lens shapes.

According to this example, optical surfaces independent from each other can be formed on a plurality of lenses 21 having different lens shapes, as shown in, e.g., FIG. 8.

According to this example, the plurality of lenses are arranged to surround the turning center of the processing locus. The processing positions along the rotating shaft are numerically controlled for the respective lenses such that three-dimensional lens surfaces independent of each other can be formed on the respective lenses. Then, all the lenses are processed simultaneously. Therefore, the lenses can be processed quickly, thus improving the productivity.

INDUSTRIAL APPLICABILITY

With the lens processing method according to the present invention, a highly accurate lens having no specific defect can be formed efficiently. Thus, an aspheric lens such as a progressive-power lens can be manufactured easily and highly efficiently.

The invention claimed is:

1. A lens processing method of processing an optical surface of a lens held and rotated by a rotating shaft of a lathe into an aspherical shape by a processing tool from a direction perpendicular to an axis of the rotating shaft and an axial direction of the rotating shaft while a processing locus which is either concentric or spiral about the rotating shaft as the center is formed, comprising the step of arranging the lens, wherein in the step of arranging the lens, lens shape information on a spectacle lens is obtained in advance, and the lens is arranged such that the rotating shaft is positioned at least outside a lens shape region of the lens.

2. A lens processing method according to claim 1, wherein the lens comprises a plurality of lenses that are arranged to surround the rotating center, and the lens processing method further comprises the step of numerically controlling processing positions in an axial direction of the rotating shaft for the respective lenses so that three-dimensional lens surfaces independent of each other are formed on the respective lenses, and processing all the lenses simultaneously.

3. A lens processing method according to claim 2, wherein the step of numerically controlling the processing positions for the respective lenses comprises the step of setting the processing locus in the axial direction of the rotating shaft between two lenses adjacent in a traveling direction of the turning processing locus which is laid about the rotating shaft as a center, on the basis of a gradient at an end portion of the processing locus of the lens located on a leading side of the turning processing locus and a gradient at a start portion of the processing locus of the lens located on a trailing side of the turning processing locus.

4. A lens processing method according to claim 3, wherein in the step of setting the processing locus in the axial direction of the rotating shaft between the two adjacent lenses, a primary differential coefficient of the gradient at the end portion of the processing locus is substantially equal to the gradient of the start portion of the processing locus, and the processing locus in the axial direction of the rotating shaft at an intermediate portion between the end portion of the processing locus and the start portion of the processing locus includes at least one of an arc and a plane.

5. A lens processing method according to claim 1, wherein the lens comprises a progressive-power lens, and the lens processing method further comprises the step of setting at least one of a near power measurement reference position and distance power reference position of the progressive-power lens along a radiating line extending from the rotating center through an optical center of the lens.

6. A lens processing method according to claim 1, wherein the lens is one of a progressive-power spectacle lens, a spectacle lens including a prism amount, and a spectacle lens including a progressive power and a prism amount, and the lens processing method further comprises the step of setting a cylinder axis in a direction perpendicular to the radiating line when the lens includes a cylindrical power component and a cylindrical power of the lens exhibits a negative value.

7. A lens processing device for processing a lens using a lens method defined in claim 1.

8. A lens processing method of processing an optical surface of a lens held and rotated by a rotating shaft of a lathe into an aspherical shape by a processing tool from a direction perpendicular to an axis of the rotating shaft and an axial direction of the rotating shaft while a processing locus which is either concentric or spiral about the rotating shaft as the center is formed, comprising the step of arranging the lens, wherein the step of arranging the lens comprises the step of obtaining lens shape information on a spectacle lens in advance and arranging the lens such that the rotating shaft is positioned at least outside a lens shape region of the lens.

9. A lens processing method according to claim 8 wherein the lens comprises a plurality of lenses that are arranged to surround the rotating center, and the lens processing method further comprises the step of numerically controlling processing positions in an axial direction of the rotating shaft for the respective lenses so that three-dimensional lens surfaces independent of each other are formed on the respective lenses, and processing all the lenses simultaneously.

10. A lens processing method according to claim 9, wherein the step of numerically controlling the processing positions for the respective lenses comprises the step of setting the processing locus in the axial direction of the rotating shaft between two lenses adjacent in a traveling direction of the turning processing locus which is laid about the rotating shaft as a center, on the basis of a gradient at an end portion of the processing locus of the lens located on a leading side of the turning processing locus and a gradient at a start portion of the processing locus of the lens located on a trailing side of the turning processing locus.

11. A lens processing method according to claim 10, wherein in the step of setting the processing locus in the axial direction of the rotating shaft between the two adjacent lenses, a primary differential coefficient of the gradient at the end portion of the processing locus is substantially equal to the gradient of the start portion of the processing locus, and the processing locus in the axial direction of the rotating shaft at an intermediate portion between the end portion of the processing locus and the start portion of the processing locus includes at least one of an arc and a plane.

12. A lens processing method according to claim 8, wherein the lens comprises a progressive-power lens, and the lens processing method further comprises the step of setting at least one of a near power measurement reference position and distance power reference position of the progressive-power lens along a radiating line extending from the rotating center through an optical center of the lens.

13. A lens processing method according to claim 8, wherein the lens is one of a progressive-power spectacle lens, a spectacle lens including a prism amount, and a spectacle lens including a progressive power and a prism amount, and the lens processing method further comprises the step of setting a cylinder axis in a direction perpendicular to the radiating line when the lens includes a cylindrical power component and a cylindrical power of the lens exhibits a negative value.

14. A lens processing device for processing a lens using a lens processing method defined in claim 8.

* * * * *